Dec. 24, 1946.  H. H. JUCKSCH  2,413,143
RODENT GUN
Filed Aug. 11, 1942
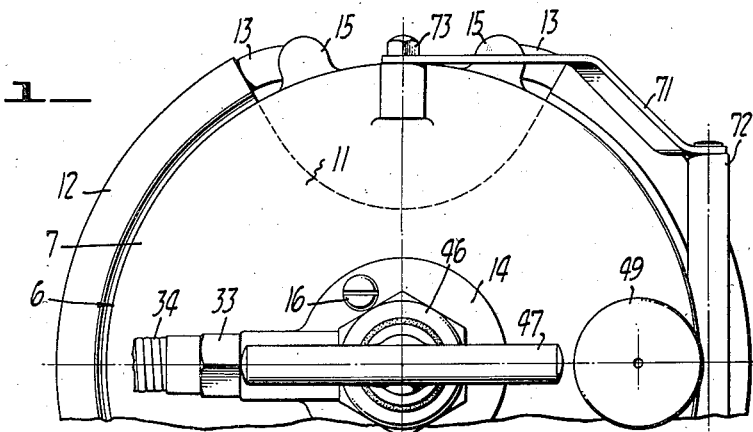
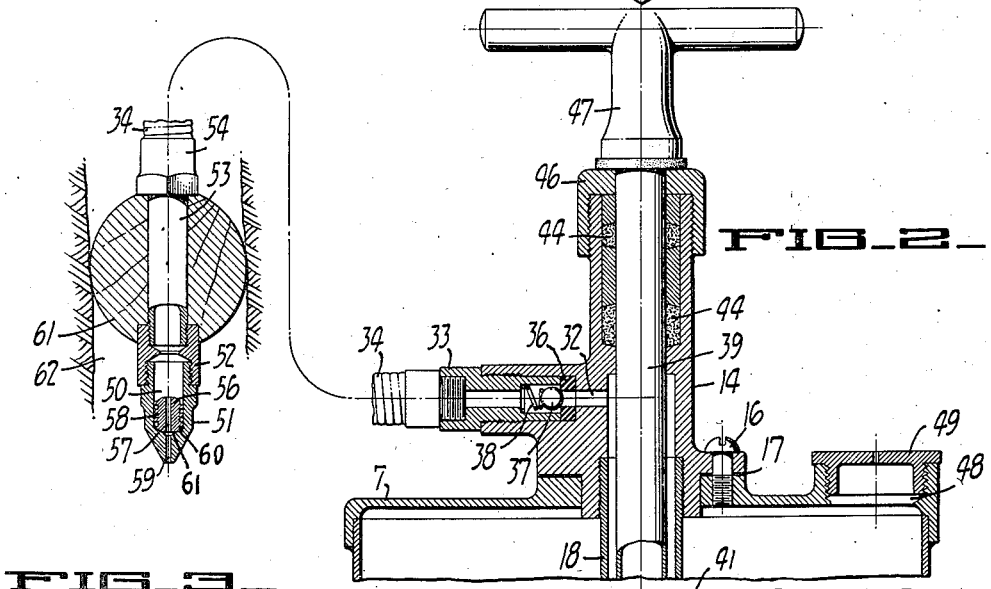
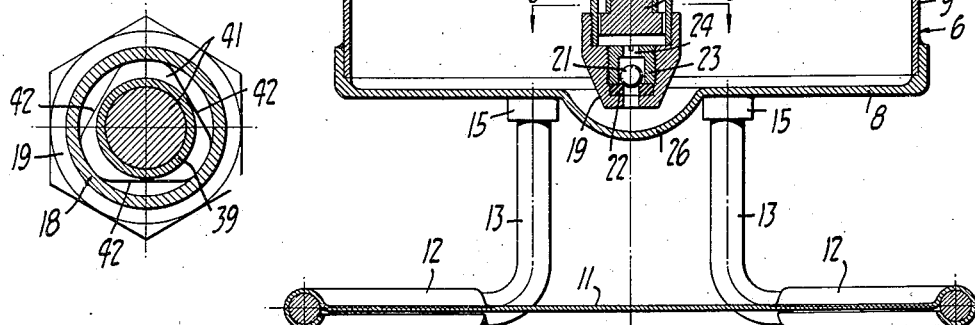
INVENTOR
Harry H. Jucksch
BY Robert N. Eckhoff
ATTORNEY Patented Dec. 24, 1946

2,413,143

UNITED STATES PATENT OFFICE 2,413,143

RODENT GUN

Harry H. Jucksch, Berkeley, Calif., assignor to Wheeler, Reynolds and Stauffer, a corporation of California Application August 11, 1942, Serial No. 454,400

1 Claim. (Cl. 43—124)

This invention relates to a device for dispensing a noxious material such as carbon bisulphide into rodent burrows to destroy rodents.

In recent years an increase has been noted in the number of destructive burowing rodents. This is due in part to a reduction in the number of predatory birds and animals, hawks, eagles, coyotes and badgers, with the advent of civilization. Another factor contributing to the increase in the number of rodents has been improved rodent living conditions brought about by a more abundant food supply. A modern farm provides liberally of a suitable variety of food, consequently, rodent migration has occurred from the poorer areas to the more highly developed areas.

Good farming practice today provides a liberal annular appropriation for pest control. Under this is included rodents and other destructive pests. Rodents do considerable damage for they consume or destroy large quantities of grain and other valuable material. Their burrows render planting, cultivation and harvesting difficult and expensive. Furthermore, their deep perforations in the soil contribute to and assist soil erosion. Diseased rodents, and many of them in certain areas are diseased, form an unique medium which menaces the life and health of humans as well as domestic pets, fowl and livestock.

The application of carbon bisulphide for rodent control has long been practiced. However, there remains the problem of effectively applying a charge of carbon bisulphide to a rodent burrow in the field. In this connection it must be remembered that hundreds of burrows must be treated and, consequently, the apparatus employed must be light in weight and, at the same time, economical in operation and yet efficient in that the carbon bisulphide is effectively applied.

Actual burrow treatment, particularly where the burrows are numerous, is frequently conducted by two men, one to operate a dispensing means and the other to place a discharge hose from the dispensing means in each burrow. Where one man operates the device, the hose is placed and then the dispensing means is operated.

It is in general the broad object of the present invention to provide a light, simple, rugged and yet accurate dispenser for such a chemical as carbon bisulphide.

Carbon bisulphide boils at 46.3° C. When operating in the late spring and summer in open fields where little protection is afforded, the bisulphide may become heated nearly to this temperature. Care must, therefore, be taken that vapor locking does not occur and that liquid bisulphide is measured and dispersed. This is particularly insured with the present device.

In the application of a noxious chemical such as carbon bisulphide I have found it essential that the material be supplied to the rodent burrow in such form that it is practically effective instantaneously. Thus, in accordance with the present invention, I atomize the carbon bisulphide directly in the rodent burrow so that the carbon bisulphide vapors can mix with and form a noxious composition with the air in the burrow and no time is lost in volatilization of the material in the burrow. Following the method of this invention the carbon bisulphide is ejected, atomized and mixed with the air in the burrow so that the carbon bisulphide-air mixture circulates through the burrow and penetrates into all portions thereof rapidly and effectively. In this connection it must be remembered that a rodent burrow usually includes a series of intercommunicating passages branching out in various directions, some of which may open to the surface and others of which may be blind. If the carbon bisulphide is merely poured into the burrow opening, a portion of it may be lost to the outside atmosphere and some other portion absorbed in the ground whereby, instead of creating a lethal concentration of carbon bisulphide in the burrow, a non-lethal application will be made and the labor and carbon bisulphide thus wasted.

Carbon bisulphide has a high vapor pressure and vaporizes readily at ordinary atmospheric temperatures. The apparatus of this invention enables a small, accurately measured charge to be discharged and atomized into each burrow even though the apparatus includes a flexible hose.

It is an object of this invention to provide a carbon bisulphide dispenser capable of measuring a small accurate liquid volume and discharging this completely from a flexible discharge conduit into a rodent burrow.

The invention includes other objects and features of advantage, some of which, together with the foregoing, will appear hereinafter, wherein the present form of carbon bisulphide dispenser of this invention is disclosed.

In the drawing accompanying and forming a part hereof, Figure 1 is a partial plan view.

Figure 2 is a side elevation partly in section of the dispenser shown in Figure 1.

Figure 3 is a section taken along the line of 3—3 of Figure 2.

The carbon bisulphide dispenser of the present invention includes a liquid supply vessel indicated generally at 6 and made up of a head 7, a bottom 8 and a tubular intermediate section 9, suitably joined together. The liquid supply vessel is of such a size as will provide a suitable liquid capacity. A base for supporting the supply vessel is provided by a plate 11, the peripheral edge 12 of which is fastened over suitable wire legs 13 depending from and secured to base 8 as at 15.

In accordance with this invention, means are provided for forcefully ejecting material from the liquid supply vessel. Mounted upon head 7 to form a continuation thereof is a suitable support member 14 secured to the head 7 by screws 16, gasket 17 being placed between the support 14 and the head 7. A tube 18 is screwed into the support member 14 and depends into the supply vessel 6 to adjacent a well 26 in the bottom thereof. At the lower end of the tube is provided a valve structure generally indicated as 19. This valve structure includes a valve member 21 in the form of a ball. The ball normally rests on a seat 22 in a sealing relation. To retain the ball in place when it is raised off its seat a cage 23 is screwed into the valve structure 19 and includes a passage 24 for fluid passing through the valve structure into tube 18. The bottom of the valve structure depends into well 26 so that practically all the liquid in the liquid supply vessel can be withdrawn effectively.

The upper end of tube 18 opens into an outlet passageway 32 in the member 14, this passageway discharging through a fitting 33 into a suitable flexible hose 34. A valve seat 36 is provided between the fitting 33 and the member 14. A ball 37 is urged by a spring 38 to close the passage 32 until a pressure is created therein sufficient to overcome the bias of the spring 38.

To withdraw liquid from the liquid supply vessel and eject it through the flexible hose 34 past the valve 37, I provide a plunger 39 depending from the member 14 into the tube 18 and of such a size that it fills a substantial portion of the tube 18 when it is lowered and so causes liquid to be ejected. The bottom end of the plunger 39 carries a closure and guide member 41 secured in the end of a tube. This member includes a plurality of flats thereon as at 42 so that fluid can move past the member freely when the plunger is forced down into liquid filled tube 18 and valve 19 is closed.

The upper end of plunger 39 extends beyond member 14, the plunger being suitably sealed by a plurality of packing glands indicated at 44 and retained in place by a cap 46. A suitable handle 47 is provided upon the end of the plunger to permit ready manipulation.

In operation, the vessel being suitably filled with the liquid to be employed through opening 48 in head 7 and closure 49 replaced, the plunger 39 is raised with the handle 47, and the interior of tube 18 will be placed under a reduced pressure. Consequently, the ball 21 will be raised off its seat and the liquid will flow into the tube 18. If one now depresses the handle 47 and forces plunger 39 down into tube 18, the ball 21 will be held on its seat and, as the handle 47 continues to move downwardly, the fluid in tube 18 will be placed under pressure sufficient to move ball 37 off its seat whereby the fluids can be forcefully ejected into the flexible hose 34.

The pump disclosed is particularly suited to carbon bisulphide dispensing because it operates without creating an extreme low pressure at which vapor locking of the pump can occur, particularly at high atmospheric temperatures. The inlet to the pump being under a positive liquid head insures filling of the tube 18 with liquid and reduces tendency of the liquid to boil. Further, the inlet is a simple structure in which little pressure drop occurs so that the tube 18 fills readily with liquid. The ejection of the liquid is done under a positive pressure so that any vaporization tendency is reduced if not eliminated.

In accordance with this invention, material discharged through the hose 34 is preferably atomized directly in the rodent burrow. Therefore, I provide upon the discharge end of the flexible hose a suitable atomizing means such as that indicated by spray nozzle 51, having an outlet passage 59 from a base 50. The form of nozzle shown includes a fitting 52 secured on the end of tube 53, tube 53 being attached to fitting 54 on the end of the flexible hose. Within base 50 in nozzle 51 is provided a rotatable member 56 having a central passage 57 of capillary size there through and a spirally cut passage 58 formed on the periphery thereof in the form of a screw thread. In operation, liquid forced through passage 57 will hold the member 56 slightly away from face 61 at the end of the bore in the spray nozzle so that the member 56 rotates freely under the influence of the liquid forced to pass along the screw thread between the member and the nozzle base. Consequently, the fluid ejected through outlet passage 59 in the spray nozzle will have imparted to it such forces that the liquid ejected is quickly atomized forcefully and positively closely adjacent to the spray nozzle.

In applying carbon disulphide in a rodent burrow in accordance with this invention, I preferably position a wooden ball 61 on the tube 53, the ball being recessed to receive the fitting 52 and being retained in place by drawing the fitting 52 and the fitting 54 together with the ball between. When applying the carbon bisulphide to a rodent burrow, the nozzle and ball are inserted into the burrow 62 for a distance from 14 to 18 inches. The ball will normally fill the burrow practically completely but only temporarily. Thereafter the plunger is given a single stroke and a full charge of carbon bisulphide is thereupon discharged in atomized form into the burrow. The ball thus keeps the spray nozzle out of contact with the earth in the burrow and, at the same time, temporarily fills the burrow so that the carbon bisulphide does not become mixed with the atmosphere exterior to the burrow. Upon withdrawing the ball and nozzle a couple of shovelfulls of earth are forced into the burrow to seal it more or less permanently. This operation is repeated for each burrow opening.

When the device is not in use, as when the nozzle is moved from burrow to burrow, the hose 34 remains filled with liquid. This is secured by ball 37 being held by spring 38 to close the opening 32, and thus seal this end of the hose. At the other end of the hose, member 56 has a convex face 60 which seats against face 61 in the nozzle 51 so the only passage from the hose is thru the passage 57. Since this passage is of capillary size, evaporation and leakage are negligible and of no consequence. When the handle 47 is lowered, ball 37 is unseated and liquid is forced into the hose. Since the liquid will pass more freely about the member 56 than thru the capillary passage 57, the member is forced back into the nozzle and spins rapidly to atomize the liquid. Without such a nozzle, the liquid will drain from the hose as it is moved about from burrow to burrow. This is not only objectionable, for it prevents accurate burrow dosage, but dangerous from a fire and poison hazard standpoint.

In operation the present device has proven particularly effective, being rugged, simple to operate and very efficient. It is easily transported from place to place by a handle 71 having a suitable grip 72 to fit in the operator's hand, the handle being suitably mounted by studs 73 on opposite sides of the head 7.

This is a continuation in part of application Serial No. 327,043 filed March 30, 1940.

I claim:

A device for measuring out a liquid charge of a noxious material and for discharging said charge under pressure to vaporize the same in a rodent burrow, said device comprising a vessel for retaining a supply of said liquid noxious material, a discharge hose having an inlet and an outlet, an atomizing spray nozzle on the outlet end of said hose adapted to pass liquid for spraying substantially only on creation in said hose of a pressure in excess of atmospheric, a valve positioned at the inlet end of said hose and biased normally to a closed position, and a pump for withdrawing liquid from said vessel and forcing it against and past said valve into said hose and through said nozzle, said spray nozzle including a hollow discharge nozzle having an outlet at one end and a valve member spirally cut on its periphery and rotatably mounted in said discharge nozzle cooperatively adjacent said end, with a central capillary passage therethrough.

HARRY H. JUCKSCH.